US009064370B1

(12) United States Patent
Daniel

(10) Patent No.: US 9,064,370 B1
(45) Date of Patent: Jun. 23, 2015

(54) METHOD FOR CONDUCTING A SPORTS TECHNOLOGY REALITY TELEVISION SHOW

(76) Inventor: Isaac S. Daniel, Miramar, FL (US)

( * ) Notice: Subject to any disclaimer, the term of this patent is extended or adjusted under 35 U.S.C. 154(b) by 470 days.

(21) Appl. No.: 13/475,701

(22) Filed: May 18, 2012

Related U.S. Application Data

(63) Continuation-in-part of application No. PCT/US2010/058034, filed on Nov. 24, 2010, and a continuation-in-part of application No. 12/833,664, filed on Jul. 9, 2010, now abandoned, and a continuation-in-part of application No. 13/074,980, filed on Mar. 29, 2011, and a continuation-in-part of application No. 13/456,024, filed on Apr. 25, 2012, application No. 13/475,701, which is a continuation-in-part of application No. 13/448,001, filed on Apr. 16, 2012, and a continuation-in-part of application No. 12/378,066, filed on Feb. 11, 2009, now Pat. No. 8,644,507, and a continuation-in-part of application No. 12/454,162, filed on May 13, 2009, now Pat. No. 8,249,254, and a continuation-in-part of application No. 12/614,122, filed on Nov. 6, 2009.

(60) Provisional application No. 61/487,582, filed on May 18, 2011, provisional application No. 61/478,834, filed on Apr. 25, 2011.

(51) Int. Cl.
*H04L 9/28* (2006.01)
*G07F 17/32* (2006.01)

(52) U.S. Cl.
CPC .................................... *G07F 17/32* (2013.01)

(58) Field of Classification Search
CPC ....... G07F 17/32; G07F 17/323; A63F 13/12; A63F 2300/401; A63F 2300/532
USPC ........................................................ 380/251
See application file for complete search history.

(56) References Cited

U.S. PATENT DOCUMENTS 5,600,730 A * 2/1997 Kenning et al. ................ 381/77
5,646,589 A 7/1997 Murray et al.

(Continued)

FOREIGN PATENT DOCUMENTS

WO WO 2008/032315 A 3/2008

OTHER PUBLICATIONS

Yi et al., "Research on the Virtual Forcast Mehtod of Background Advertisement Exposal Parameter of Sport Events", 2009, pp. 1-4.*

(Continued)

*Primary Examiner* — Yonas Bayou
(74) *Attorney, Agent, or Firm* — Alberto Interian III, Esq.

(57) ABSTRACT

A method for conducting a reality sports television show, where the method includes providing a cast, wherein the cast comprises a plurality of sports players that remain undrafted by a professional sports league, broadcasting a plurality of private lives of the cast, broadcasting the cast playing at least one sports game, wherein the sports game comprises a game without timeouts and huddles, and wherein on-field communication between the cast is accomplished by using a means for improving in-game communications, wherein said means includes at least one player transceiver for transmitting and receiving audio or visual communications to and from players, coaches, referees, or television production members, and at least one coach transceiver for transmitting and receiving audio or visual communications to and from players, coaches, referees, or television production members.

7 Claims, 4 Drawing Sheets

(56) References Cited

U.S. PATENT DOCUMENTS

| | | | | |
|---|---|---|---|---|
| 7,171,553 | B2 | 1/2007 | Rix et al. | |
| 7,702,101 | B2 | 4/2010 | Malcolm et al. | |
| 8,142,283 | B2 * | 3/2012 | Lutnick et al. | 463/29 |
| 8,480,471 | B2 * | 7/2013 | Lutnick et al. | 463/17 |
| 8,758,109 | B2 * | 6/2014 | Lutnick | 463/16 |
| 2002/0132211 | A1 | 9/2002 | August | |
| 2003/0005437 | A1 | 1/2003 | Feuer et al. | |
| 2004/0009816 | A1 * | 1/2004 | Miller | 463/42 |
| 2004/0102931 | A1 | 5/2004 | Ellis et al. | |
| 2006/0025214 | A1 | 2/2006 | Smith | |
| 2006/0136173 | A1 * | 6/2006 | Case et al. | 702/182 |
| 2007/0027406 | A1 * | 2/2007 | LaPlaca et al. | 600/558 |
| 2007/0055989 | A1 | 3/2007 | Shanks et al. | |
| 2007/0113250 | A1 * | 5/2007 | Logan et al. | 725/46 |
| 2007/0143382 | A1 | 6/2007 | Luster | |
| 2008/0004904 | A1 * | 1/2008 | Tran | 705/2 |
| 2009/0239710 | A1 * | 9/2009 | Shemesh et al. | 482/8 |
| 2010/0211900 | A1 * | 8/2010 | Fujioka | 715/765 |
| 2011/0028207 | A1 * | 2/2011 | Gagner et al. | 463/25 |
| 2011/0205167 | A1 * | 8/2011 | Massengill | 345/173 |

OTHER PUBLICATIONS

Ugarte et al., "TV Sport Broadcast Real Time Virtual Representation in 3D Terrain Models", 2008, pp. 405-408.*

Mark Andrejevic, "Reality TV the Work of Being Watched", 2003, pp. 1-37.

Galena et al., "The King-Devick test as a determinant of head trauma and concussion in boxers and MMA fighters", Feb. 2, 2011, pp. 1-9.

USPTO, Office Action, Notice of References Cited, U.S. Appl. No. 13/482,821, filed May 29, 2012, notification date Nov. 8, 2013.

* cited by examiner

METHOD FOR CONDUCTING A SPORTS TECHNOLOGY REALITY TELEVISION SHOW

PRIORITY CLAIM

The present application is a Non-Provisional of U.S. Provisional Patent Application Ser. No. 61/487,582, titled “Method for Conducting a Sports Technology Reality Television Show,” filed on May 18, 2011, by Isaac S. Daniel; and is a Continuation-in-Part of Patent Cooperation Treaty Patent Application Serial Number PCT/US10/58034, filed on Nov. 24, 2010, by F3M3 Companies, titled “System and Method for Reviewing a Play,” a Continuation-in-Part of U.S. Non-Provisional patent application Ser. No. 12/833,664, titled “System and Method for Notifying a User of an Object's Presence Within a Boundary,” filed on Jul. 9, 2010, by Isaac S. Daniel, a continuation-in-part of U.S. Non-Provisional patent application Ser. No. 13/074,980, titled “Portable System and Method for Detecting a Neurological Issue”, filed on Mar. 9, 2011, by Isaac S. Daniel, and a Continuation-in-Part of U.S. Non-Provisional patent application Ser. No. 13/456,024, titled “Golf Game and Reality Television Show,” filed on Apr. 25, 2012, which is a Continuation-in-Part of U.S. Provisional Patent Application Ser. No. 61/478,834, filed on Apr. 25, 2011, titled “Golf Reality Television Show,” filed on Apr. 25, 2011, by Isaac S. Daniel, et al; U.S. patent application Ser. No. 13/448,001, titled “Golf Game and Scoring Method,” filed on Apr. 16, 2012, by Isaac S. Daniel, et al; U.S. patent application Ser. No. 12/378,066, titled “A Game Apparatus, System, and Method for Improving In-Game Communications During a Game”, filed on Feb. 11, 2009, by Isaac S. Daniel, et al; U.S. patent application Ser. No. 12/454,162, titled “An Apparatus, System and Method for Reporting a Player's Game Plays During a Game,” filed May 13, 2009, by Isaac S. Daniel; and U.S. patent application Ser. No. 12/614,122, titled a “System and Method of Distributing Game Play Instructions to Players During a Game,” filed on Nov. 6, 2009, by Isaac S. Daniel, whose priorities are claimed, and which are hereby incorporated by reference as if fully stated herein.

FIELD

The present disclosure relates generally to entertainment, and more specifically, to reality television shows related to sports that incorporate technology.

BACKGROUND

Reality television shows have increased in popularity over the past several years, and continue to be produced in various formats. In a typical reality TV show, people are portrayed as being in real-life situations without having to read from a script or perform fiction. People on reality TV shows are not typically portrayed as professional performers, but are portrayed as instead common, everyday people. To date, there have been several reality TV shows related to sports, particularly fighting sports, basketball, football, and the like. Traditional sports reality TV shows also employ the rules of traditional games.

However, due to the technological limitations of sports, such as football, as well as some of their relatively slow paces, it has not been practical to conduct a reality television focused on traditionally slow-paced sports, such as American football.

Furthermore, Americans are constantly looking for sports related entertainment when regular season play for any given sport is not taking place, which is why many television channels show game replays, sports news, and the like. Furthermore, people are also looking to follow their favorite players whom have not been drafted into professional sports leagues; this is particularly the place in college sports were well known athletes often go undrafted by a professional sports team.

SUMMARY

The various embodiments of methods described herein result from the realization that reality television shows can be made more entertaining by providing an in-depth sports reality television show that employs a quick paced game that relies on technology.

Accordingly, the various embodiments and disclosures described herein solve the limitations of the prior art in a new and novel manner.

DETAILED DESCRIPTION OF PREFERRED EMBODIMENTS

Figure 1A:
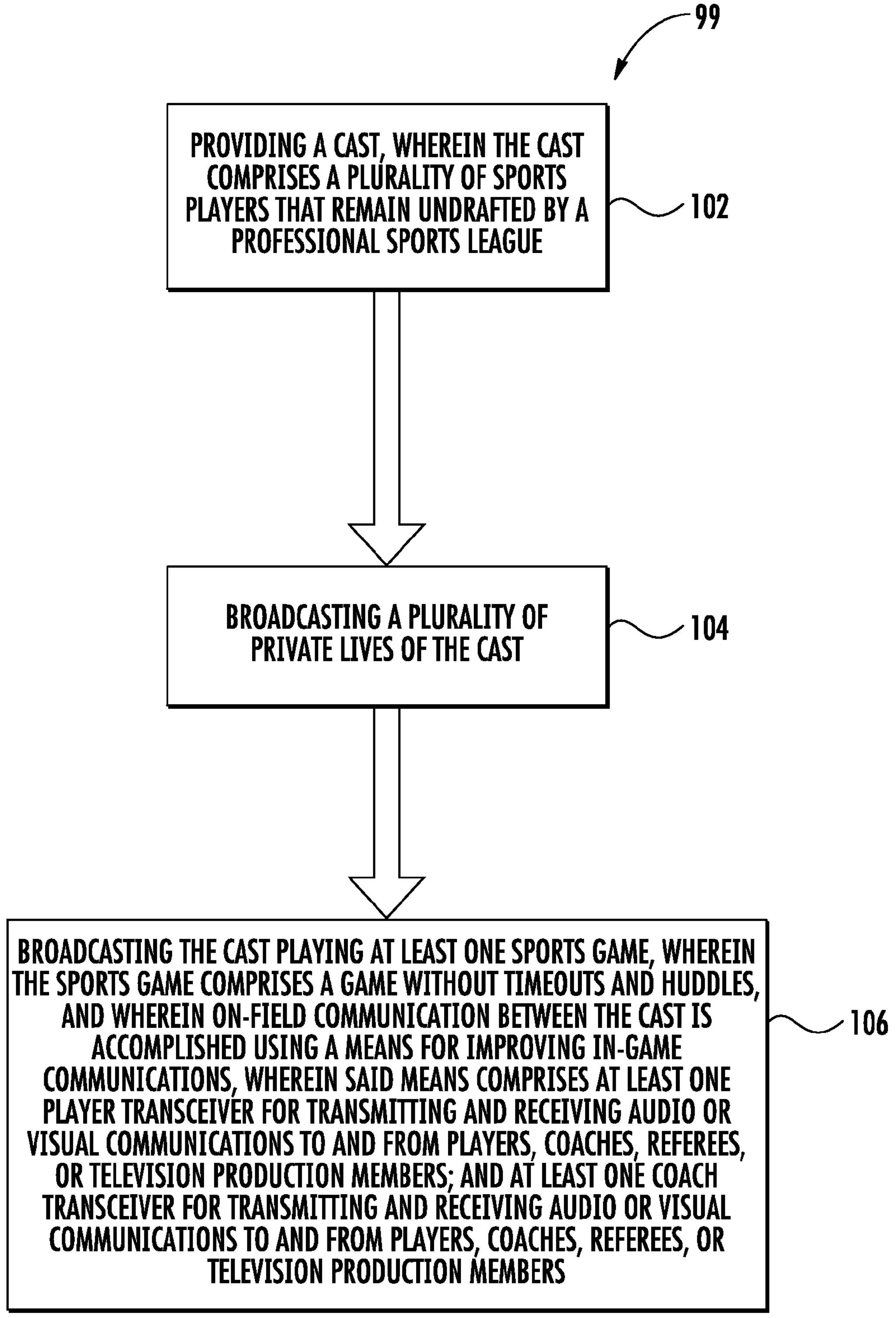
FIG. 1A shows a flow chart depicting a method in accordance with one embodiment.
Figure 1B:
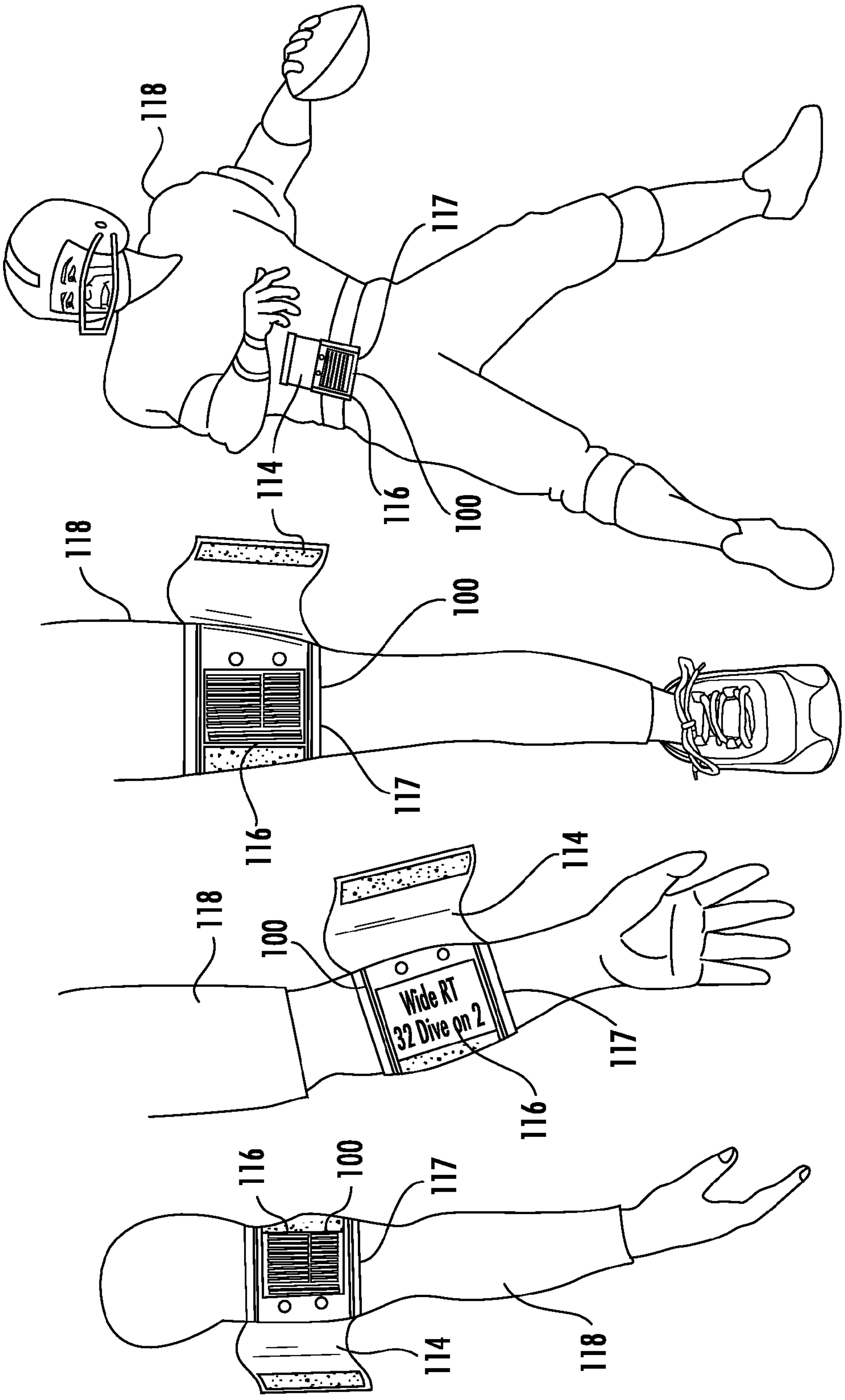
FIG. 1B shows a means for improving in-game communications in accordance with one embodiment.

Referring now to FIGS. 1A and 1B, a method 99 is shown, wherein method 99 comprises providing a cast, wherein the cast comprises a plurality of sports players that remain undrafted by a professional sports league (block 102); broadcasting a plurality of private lives of the cast (block 104); broadcasting the cast playing at least one sports game, wherein the sports game comprises a game without timeouts and huddles, and wherein on-field communication between the cast is accomplished by using a means for improving in-game communications, wherein said means comprises at least one player transceiver 100 for transmitting and receiving audio or visual communications to and from players, coaches, referees, or television production members; and at least one coach transceiver (similar to transceiver 100) for transmitting and receiving audio or visual communications to and from players, coaches, referees, or television production members (block 106).

In some embodiments, the method may comprise broadcasting the television show through any medium, including television, internet, or radio.

The term “sports”, as used herein, may refer to any type of sport, including, but not limited to, soccer, basketball, hockey, baseball, golf, American football, racing, cricket, and the like.

It should be noted that the reliance on technology not only makes the reality television show more appealing to sports enthusiasts, but to technology enthusiasts as well.

In some embodiments, the audio or visual communications may comprise plays, such as words specifying a specific play, or a visual representation of the play itself (e.g. X's and O's, or players and arrows), audibles, penalty calls, or miscellaneous communications, such as conversations and the like. In some embodiments, the means for improving in-game communications may comprise at least one referee transceiver for transmitting and receiving audio or visual communications to and from players, coaches, referees, or television production members.

The transceiver 100 may comprise at least one means 116 for displaying a visual image, such as a play, and at least one means 117 for attaching the at least one means 116 for displaying a visual image to a person's body 118. Means 117 may include a wristband, an armband, a leg band, a belt, and the like. In some embodiments, transceiver 100 may comprise a means 114 for covering means 116 for displaying at least one visual image, which may include a flap, and the like.

In some embodiments, television production crew members may be monitoring the transmissions between players and coaches and referees, and may choose to broadcast any or all of those transmissions along with the reality television show. In a further embodiment, method 99 further comprises broadcasting plays to audience members during gameplay, wherein the plays being broadcasted are plays that are selected using means 100 for improving in-game communications. In some embodiments, the means for improving in-game communications may be any of those means, systems, and methods described in Patent Cooperation Treaty Patent Application Serial Number PCT/US10/58034, filed on Nov. 24, 2010, by F3M3 Companies, titled "System and Method for Reviewing a Play," U.S. patent application Ser. No. 12/378,066, titled "A Game Apparatus, System, and Method for Improving In-Game Communications During a Game", filed on Feb. 11, 2009, by Isaac S. Daniel, et al; U.S. patent application Ser. No. 12/454,162, titled "An Apparatus, System and Method for Reporting a Player's Game Plays During a Game," filed May 13, 2009, by Isaac S. Daniel, and U.S. patent application Ser. No. 12/614,122, titled a "System and Method of Distributing Game Play Instructions to Players During a Game," whose disclosures are hereby incorporated by reference in their entireties.

In some embodiments, the cast may comprise of a plurality of teams, wherein each team comprises at least one player, at least one coach, and at least one assistant. The coach may comprise a professional coach, or an amateur coach. The at least one assistant may help the players and coaches as far as team administration, on-field preparations, and off-field preparations. The assistants may also help the players and coaches in their privates lives. The teams may compete against each other, such as in a tournament. The tournament play may be recorded and broadcasted as part of the reality television show. The cast in the selection process may be pre-screened in larger auditions, which may be performed across the country. In some embodiments, the cast may comprise lay people, while in other embodiments the cast or may comprise professional, collegiate, amateur, or undrafted sports players.

In some embodiments, the cast may provide private commentary on the show, which is recorded and showed to viewers. The private commentary may comprise personal insight, rants, reviews, journal entries, and the like.

The assistants may provide certain commentary, such as which coach or player they feel are strongest. The coaches may provide private commentary regarding their own team, or other teams. The players may provide private commentary about each other or their coaches. In some embodiments, the commentaries may be shown during any point of the show, at multiple points in the show, or at the end of the show.

In some embodiments, viewers may be asked to vote on which cast members, including players, should be selected for a particular team, or which players advance to the next round of selection or play, based on the following attributes, which include, but are not limited to: good sports skills, good team skills, personal character, and work ethic. In a further embodiment, viewers may be asked to vote on which coaches should be selected for a particular team or advance to the next round of selection or play, based on the following attributes, which include, but are not limited to: ability to coach a sports game, ability to make judgment calls, emotional intelligence, communication skills, and leadership skills.

For the viewer voting process, each attribute may be assigned a predetermined point value that may be tallied together to select a winner.

In some embodiments, votes are collected from viewers via electronic devices, such as personal computers, cell phones, lap tops, tablet PCs, and the like. In some embodiments, the communications network may comprise an open network, such as the internet or a GSM network, or a closed network such as a VPN (virtual private network), and the like. In some embodiments, a voting server may be used to collect and tally votes submitted by viewers.

In some embodiments, the viewers may base their votes on the private commentary provided by the cast, while in other embodiments viewers may base their votes on the sports activities performed by the cast or in everyday activities undertaken by the cast.

The selection of the cast may be based on sports ability, oral skills, attitude, and knowledge of sports trivia. In a preferred embodiment, the reality show may select the top ten sports territories (e.g. states, cities, and the like) to record the reality show, wherein each territory may have two week-long filming sessions, one week for selection, and another for pre-game play. The first week of selection may be based upon sports ability (e.g. passing, kicking, running, shooting, blocking, tackling, etc.), oral skills, attitude, and knowledge of sports industry questions. The second week may be based on in-game performance.

In a preferred embodiment, a producer who knows about sports may be selected to produce the show. The purpose of the show may be to demonstrate an appreciation for the spirit of team sports that are played within a short period of time, without timeouts and huddles, and with the aid of technology.

An initial screening process may comprise of candidates having to practice and present themselves to the producers, and convince the producer why they should be chosen to as part of the case. Candidates may submit their applications via e-mail, or may post them on a website, such as through profile pages or videos on websites, such as social media websites.

After considerable thought and review, the producer may select the teams. The assistants may provide private commentary, which is recorded, and which may be shown to viewers.

In some embodiments, each team may practice in the morning, and play a game, such as a charity game, in the evening for a predetermined amount of time.

The recorded private commentaries by the assistants may be played, as well as those by the coaches and players. In other embodiments, the coach and player commentaries may be played throughout the week.

In some embodiments, the daily or private lives of the cast, including their non-sports related activities, may be recorded and broadcasted, which may be used by viewers to gauge cast members' private characteristics, behavior, and composure.

In a preferred embodiment, the reality show could communicate not only the sports lives of the cast, but also the private lives of the cast to viewers, so that viewers can see how cast members are able to hold day jobs and lead normal lives, but also play sports. Accordingly, the cast will be expected to maintain professional and personal commitments, such as those owed to their jobs, families, and friends. Diversion may be shown as well, such as communications with family members, good news, bad news, everyday life agonies and joys, so that viewers may determine whether the cast members have a life condition that will enable them to be the best players.

In some embodiments, the reality show's broadcast may be limited to local areas, such as states or cities, or may be broadcasted at the national level.

Figure 2:
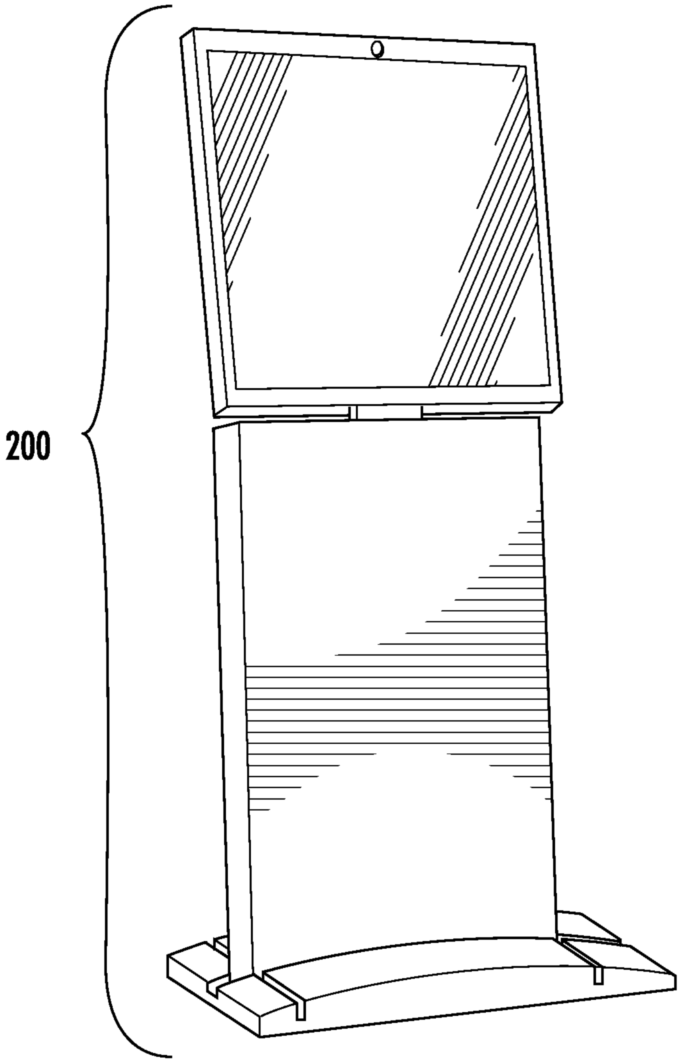
FIG. 2 shows a portable concussion tracking device in accordance with one embodiment.

In a further embodiment, sports safety may be a focus of the show, since sports safety, particularly concussion related safety issues, has been an issue in the sports industry. Accordingly, in some embodiments, members of the cast may be required to be tested for brain or head injuries using a portable concussion tracker, such as concussion tracker 200 shown in FIG. 2. Concussion tracker 200 may comprise a display device connected to an electronic eye tracker, wherein certain images may be displayed on the display device and the electronic eye tracker may be used to analyze a user's eye behavior when viewing the images. In another embodiment, a concussion test, such as the King-Devick Test™ may be administrated using the display device, and the electronic eye tracker may be used to track the user's eyes for grading the user's performance when taking the King-Devick Test™. Concussion tracker 200 may be used to establish a baseline measurement of cast members prior to playing, and for detecting concussions that may have occurred during gameplay or practice. Concussion tracker 200 may comprise any of the various embodiments of systems and methods for detecting a neurological issue disclosed in U.S. Non-Provisional patent application Ser. No. 13/074,980, titled "Portable System and Method for Detecting a Neurological Issue", filed on Mar. 9, 2011, by Isaac S. Daniel, whose disclosure is hereby incorporated by reference as if fully stated herein.

In yet a further embodiment, cast members may be required to attend a "sports technology" training clinic, which may be recorded and broadcasted as part of the television reality shown. In some embodiments, by operating and broadcasting the sports technology clinic, cast members and audience members may be shown how to improve sports safety, how to read sports plays, such as football routes, how to deal with crowd noise during games, and how to use emerging sports technology, such as means 100 for improving in-game communications and concussion tracker 200.

The training clinic may serve as a precedent for any actual games played during the reality television show. Furthermore for convenience purposes and ease of training, teams, during the training clinic, may be smaller than traditional sizes (for example, football teams comprising of seven players, basketball teams comprising of three players, and the like).

In another embodiment, the training clinic may serve as a training and rehabilitation center for sports athletes that have suffered brain injuries, such as concussions, and their rehabilitation and subsequent gameplay may be incorporated into the reality television show.

Hardware and Operating Environment

This section provides an overview of example hardware and the operating environments in conjunction with which embodiments of the inventive subject matter can be implemented. A software program may be launched from a computer readable medium in a computer-based system to execute the functions defined in the software program. Various programming languages may be employed to create software programs designed to implement the systems and methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 3 below.

Figure 3:
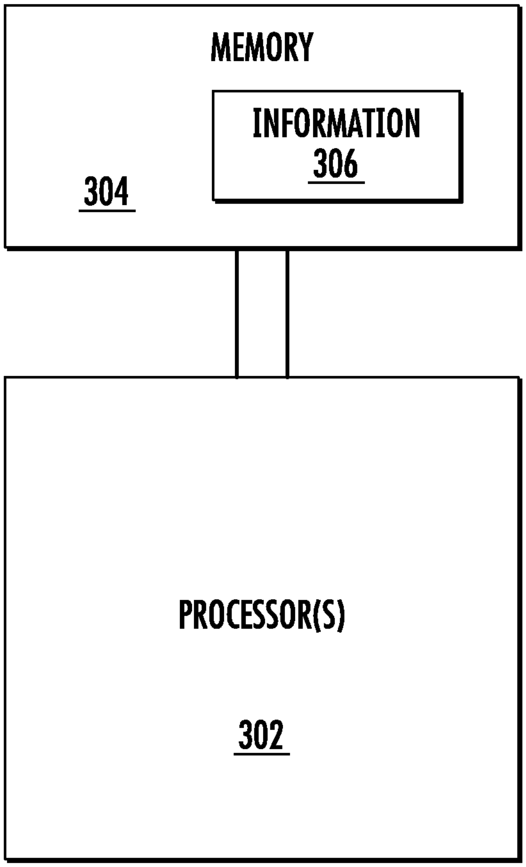
FIG. 3 is a block diagram depicting an article in accordance with one embodiment.

FIG. 3 is a block diagram depicting an article 300 according to various embodiments. Such embodiments may comprise a computer, a memory system, a magnetic or optical disk, some other storage device, or any type of electronic device or system. The article 300 may include one or more processor(s) 302 coupled to a machine-accessible medium such as a memory 304 (e.g., a memory including electrical, optical, or electromagnetic elements). The memory may contain associated information 306 (e.g., computer program instructions, data, or both), which, when accessed, results in a machine (e.g., the processor(s) 302) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

The invention claimed is:

1. A method for conducting a reality sports television show, comprising:

a) providing a cast, wherein the cast comprises a plurality of sports players that remain undrafted by a professional sports league;

b) broadcasting a plurality of private lives of the cast;

c) broadcasting the cast playing at least one sports game, wherein the sports game comprises a game without timeouts and huddles, and wherein on-field communication between the cast is accomplished by using a means for improving in-game communications, wherein said means comprises:

i) at least one player transceiver for transmitting and receiving audio or visual communications to and from players, coaches, referees, or television production members; and ii) at least one coach transceiver for transmitting and receiving audio or visual communications to and from players, coaches, referees, or television production members.

2. The method of claim 1, wherein the audio or visual communications comprise sports plays, audibles, penalty calls, or miscellaneous communications.

3. The method of claim 1, wherein the means for improving in-game communications comprises at least one referee transceiver for transmitting and receiving audio or visual communications to and from players, coaches, referees, or television production members.

4. The method of claim 1, wherein a transceiver comprises:

a) at least one means for displaying a sports play; and b) at least one means for attaching the at least one means for displaying a sports play to a person's wrist.

5. The method of claim 1, further comprising broadcasting plays to audience members during gameplay, wherein the plays being broadcasted are plays that are selected using the means for improving in-game communications.

6. The method of claim 1, further comprising using at least one concussion tracker to test cast members for brain injuries.

7. The method of claim 1, further comprising subjecting cast members to a sports technology training clinic.

* * * * *